No. 833,077. PATENTED OCT. 9, 1906.
E. B. MEYROWITZ.
EYEGLASSES.
APPLICATION FILED AUG. 2, 1904.

Witnesses
Francis S. Ober
Waldo M. Chapin

Inventor:
Emil B. Meyrowitz,
By his Attorneys
Rosenbaum & Stockbridge.

UNITED STATES PATENT OFFICE.

EMIL B. MEYROWITZ, OF NEW YORK, N. Y., ASSIGNOR TO THE MEYROWITZ MANUFACTURING COMPANY, A CORPORATION OF NEW JERSEY.

EYEGLASSES.

No. 833,077.   Specification of Letters Patent.   Patented Oct. 9, 1906.

Application filed August 2, 1904. Serial No. 219,204.

*To all whom it may concern:*

Be it known that I, EMIL B. MEYROWITZ, a citizen of the United States, residing at the city of New York, in the borough of Manhattan and State of New York, have invented certain new and useful Improvements in Eyeglasses, of which the following is a full, clear, and exact description.

My invention is designed for the production of an improved form of bridge and spring for eyeglasses whereby the glasses may be retained in place by the engagement of the ordinary nose-guard with the nose of the wearer and at the same time be supported upon or against the nose of the wearer, so that accidental displacement of the same is prevented.

The invention consists of a rigid bridge having springs connected to the opposite ends thereof and to the two posts from which the lenses and nose-guards are ordinarily supported.

It also consists in certain features and details of construction and combinations of parts, which will be hereinafter more fully described and claimed.

Figure 1:
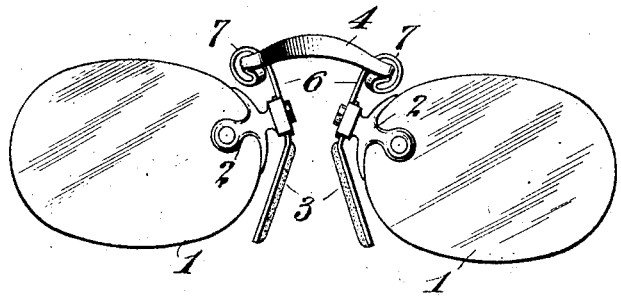
Figure 2:
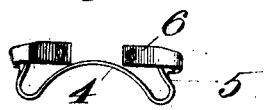
Figure 3:
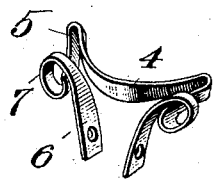

In the drawings forming part of the specification, Figure 1 is a front elevation of a pair of eyeglasses embodying my improvement. Fig. 2 is a plan view of the bridge, and Fig. 3 is a perspective view of the same.

Like reference-numerals indicate like parts in the different views.

The lenses 1, the posts 2, and the nose-guards 3 may be of any suitable or preferred construction. The bridge 4 is preferably made of sheet metal, the same being practically rigid and curved or arched to conform to the shape of the nose of the wearer, against which it is adapted to bear. The said bridge is formed with forwardly-extending ends 5, which are provided with lateral arms 6, extending at substantially right angles thereto. These arms are coiled, as shown at 7, around the ends 5, forming springs, the said springs being connected to the posts 2, as shown. The tendency of the spring-arms 6 is to contract or draw together the nose-guards 3, so that said guards may serve as a means for connecting the glasses to the nose of the user. In this respect said springs or spring-arms act in the same manner as the ordinary bridge-spring commonly employed in eyeglasses. By forming said springs upon the ends of the bridge 4, however and so shaping and disposing said bridge as to enable it to rest upon or against the nose of the wearer, the glasses are held or sustained from two points, so that wabbling or disarrangement of the glasses when in use is prevented. The bridge 4 has been shown as bearing against that portion of the nose directly between the eyes. It is obvious, however, that by connecting the ends of the arms 6 to the posts 2 differently the lenses may be located either in front or behind said bridge, which features of adjustability are sometimes desirable in the fitting of glasses.

The bridge or connecting member 4 has been illustrated as having a rigid arched middle or body portion, with the ends thereof bent or turned upon its convex side, as shown at 5, and then bent downwardly and formed into the coils 7, whose axes are substantially parallel to the returned end parts 5 and which have their extremities secured to the posts 2.

What I claim as my invention is—

1. A bridge for eyeglasses having a rigid body portion of flat resilient metal disposed with its greatest width in a plane parallel with the plane of the glasses, said resilient metal having its extremities deflected into spiral coils with their greatest width normal to such plane of the glasses, said extremities being prolonged into terminal portions adapted to be connected to the usual glasses, and nose-guards depending from said terminal portions.

2. A bridge for eyeglasses having a rigid body portion of resilient metal having its greatest width in a plane parallel to the plane of the glasses and curved into an arcuate shape so as to accord with the form of the nose of the wearer, said metal having its greatest width at its central part, the extremities of said body being deflected into spiral coils having the greatest width of the metal normal to the plane of the glasses, said extremities being prolonged into terminal portions adapted to be connected to the usual glasses, whereby the glasses are supported to have a resiliently-opposed movement in their own plane, but are comparatively rigidly held against movement in any other plane, and nose-guards depending from said terminal portions.

In witness whereof I subscribe my signature in the presence of two witnesses.

EMIL B. MEYROWITZ.

Witnesses:
 HANSON C. COXE,
 JOHN BAKER.